(12) United States Patent
Rudolf et al.

(10) Patent No.: US 6,276,672 B1
(45) Date of Patent: Aug. 21, 2001

(54) DUAL-MODE TWIN-CHAMBER THRUST BEARING HAVING HYDRAULIC DAMPING

(75) Inventors: Hans-Joachim Rudolf, Stadland; Heinz Weber, Hemsbach, both of (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/488,754

(22) Filed: Jan. 21, 2000

(30) Foreign Application Priority Data

Jan. 22, 1999 (DE) .............................................. 199 02 493

(51) Int. Cl.$^7$ .............................. F16F 13/00; F16F 15/00; F16F 5/00; F16F 9/00
(52) U.S. Cl. ....................................... 267/140.13; 267/219
(58) Field of Search ............................... 188/219, 140.11, 188/140.13, 141, 141.1, 141.3, 141.4, 141.5, 141.7

(56) References Cited

U.S. PATENT DOCUMENTS

| 5,029,824 | * | 7/1991 | LaBleau et al. | 267/140.1 |
| 5,205,545 | * | 4/1993 | Quast | 267/140.13 |
| 5,263,693 | * | 11/1993 | Klein | 267/140.13 |
| 5,344,127 | | 9/1994 | Hettler et al. | 267/140.13 |
| 5,439,204 | * | 8/1995 | Yamazoe et al. | 267/140.14 |
| 5,645,138 | * | 7/1997 | Tajima et al. | 267/140.11 |
| 5,653,427 | * | 8/1997 | Matsuda et al. | 267/140.14 |
| 5,833,219 | * | 11/1998 | Mellon | 267/140.13 |
| 5,839,720 | * | 11/1998 | Kojima | 267/140.14 |
| 5,848,782 | * | 12/1998 | Hein et al. | 267/140.11 |
| 6,036,183 | * | 3/2000 | Lee et al. | 267/140.14 |

FOREIGN PATENT DOCUMENTS 198 07 868    9/1999   (DE) .

* cited by examiner

*Primary Examiner*—Robert J. Oberleitner
*Assistant Examiner*—Devon Kramer
(74) *Attorney, Agent, or Firm*—Kenyon & Kenyon

(57) ABSTRACT

A dual-mode twin-chamber thrust bearing has a work chamber and an equalizing chamber. The chambers are separated by a partition. The partition has passageway in the center that is closable via an actuator, and also has a damping channel that hydraulically connects two chambers. The partition also has holes. A membrane is located in a recess in the partition. The partition covers the holes in the partition and can be tightly sealed. An axially movable pressure disk secures or releases the membrane as it is pushed by the actuator. The pressure disk is provided with holes in the area of the partition holes.

12 Claims, 2 Drawing Sheets

DUAL-MODE TWIN-CHAMBER THRUST BEARING HAVING HYDRAULIC DAMPING

BACKGROUND OF THE INVENTION

The present invention relates generally to bearings, and more particularly to a dual-mode twin-chamber thrust bearing having hydraulic damping.

A dual-mode twin-chamber thrust bearing having hydraulic damping in particularly suited for use as an engine bearing in motor vehicles. The bearing has a working chamber and an equalizing chamber which are separated by a partition. The partition is provided with a passageway that can be closed by an actuator, and also has a damping channel that hydraulically links the two chambers. A membrane is located in a recess in the partition. The membrane effectively covers openings in the partition on both sides and can be sealingly positioned by the actuator.

Bearings of this type are used to damp both high-frequency, low-amplitude and low-frequency, high-amplitude vibrations. Higher-frequency vibrations that occur during vehicle operation are isolated by the membrane, which is arranged in a nozzle cage and becomes effective when the passageway in the center of the partition is closed. Low-frequency vibrations are suppressed by the damping channel. For example, in order to suppress low-frequency vibrations during idling, the passageway in the partition is opened and the liquid column present in the passageway acts as a damper for the vibrations.

U.S. Pat. No. 5,344,127, which is incorporated by reference, describes a dual-mode twin-chamber thrust bearing where the passageway located in the center of the partition can be closed using an actuator. The actuator is actuated by vacuum and keeps the passageway closed during operation, but the passageway is opened during idling. This embodiment has proven useful in many applications.

German Patent Application 198 07 868 represents an improvement with respect to the above-mentioned embodiment. In that patent, damping of vibrations caused by idling and isolation of higher-frequency vibrations in a speed range above idling speed is improved by the fact that the membrane can be sealingly positioned by the actuator when the passageway in the partition is opened. During operation of an engine above idling speed, the passageway is closed by the actuator during operation above the idling speed, and the seal created by the membrane positioned within the partition is removed by a restoring spring in the actuator. In this operating state, the bearing functions as a generally known hydraulically damping bearing, where the membrane is arranged so that it can move loosely back and forth within the partition in order to isolate high-frequency, low-amplitude vibrations induced by the engine. In order to damp low-frequency, high-amplitude engine vibrations during idling, the passageway is opened and the liquid present in the passageway vibrates back and forth with a phase shift. This reduces the rigidity of the bearing if there are idling vibrations.

Consistently outstanding results are achieved by using the dual-mode membrane. An elastically pre-tensioned tension element secures the position of the membrane when the passageway is open. As soon as the passageway is closed by the actuator, the membrane is released. To accomplish this, the adjusting spring has to overcome both the force required for closing the passageway and force of the tensioning element.

SUMMARY OF THE INVENTION

The object of the present invention is to further develop the thrust bearing in order to achieve further improvement in its operating and damping characteristics. Good vibration damping when the passageway in the center of the partition is securely closed and good isolation when the passageway is fully open should be achieved. The force required in opening to overcome the spring pre-tension of the closing spring should be as small as possible, since the available vacuum is limited. A pressure differential of 0.5 bar, maximum 0.7 bar, should not be exceeded. Finally, the use of a degressive closing spring should be possible.

In accordance with the above object, a dual-mode twin-chamber thrust bearing has a work chamber and an equalizing chamber. The chambers are separated by a partition. The partition has a passageway in the center that is closable via an actuator, and also has a damping channel that hydraulically connects the two chambers. The partition also has holes. A membrane is located in a recess in the partition. The membrane covers the holes in the partition and can be tightly sealed. An axially movable pressure disk secures or releases the membrane as it is pushed by the actuator. The pressure disk is provided with holes in the area of the partition holes.

The pressure disk can be displaced axially with almost no effort because it is provided with holes in the area of the partition opening. The pressure disk alternatively secures or releases the membrane when it is displaced by the actuator. The pressure disk is arranged next to the membrane in a gap formed between the top and the corresponding bottom of the partition so it can be freely displaced. Its displacement in either direction results in the membrane being either secured or released. The released membrane can be moved in either direction of the flow. The secured membrane rests firmly in contact with the bottom of the partition.

The pressure disk is provided with a hub-like connecting piece in the center, which is arranged in the passageway with its free edge pointing toward the equalizing chamber. This free edge of the connecting piece is used as a stop surface for closing the passageway. The mating surface of the seal is formed by an annular surface of the movable outer wall of the equalizing chamber.

Various embodiments of the actuator used to displace the pressure disk are conceivable. One preferred embodiment calls for the actuator to be arranged in the outer wall of the equalizing chamber and be provided with a catch. The catch protrudes into the connecting piece of the pressure disk and rests on the pressure disk. When the passageway has been opened by the actuator, the catch secures the membrane.

In order to achieve proper vibration damping, the catch may have a tulip shape. The bottom area of the tulip-shaped catch has lateral passageways, and the upper edge of the catch actuates the pressure disk. Alternatively, the catch can have a mushroom shape with a star-shaped cover. The points of the star contact the pressure disk to secure it in place.

The membrane is arranged in an annular groove of the partition bottom. It protrudes from the groove so that the pressure disk located immediately above it can perform the desired securing motion.

The pressure disk can be made of sheet metal coated with a polymeric material. The pressure disk can also be provided with sealing lips to seal the bottom of the damping channel.

It is advantageous if the openings in the pressure disk and those in the top and bottom of the partition are arranged flush to one another.

DETAILED DESCRIPTION OF THE INVENTION

Figure 1:
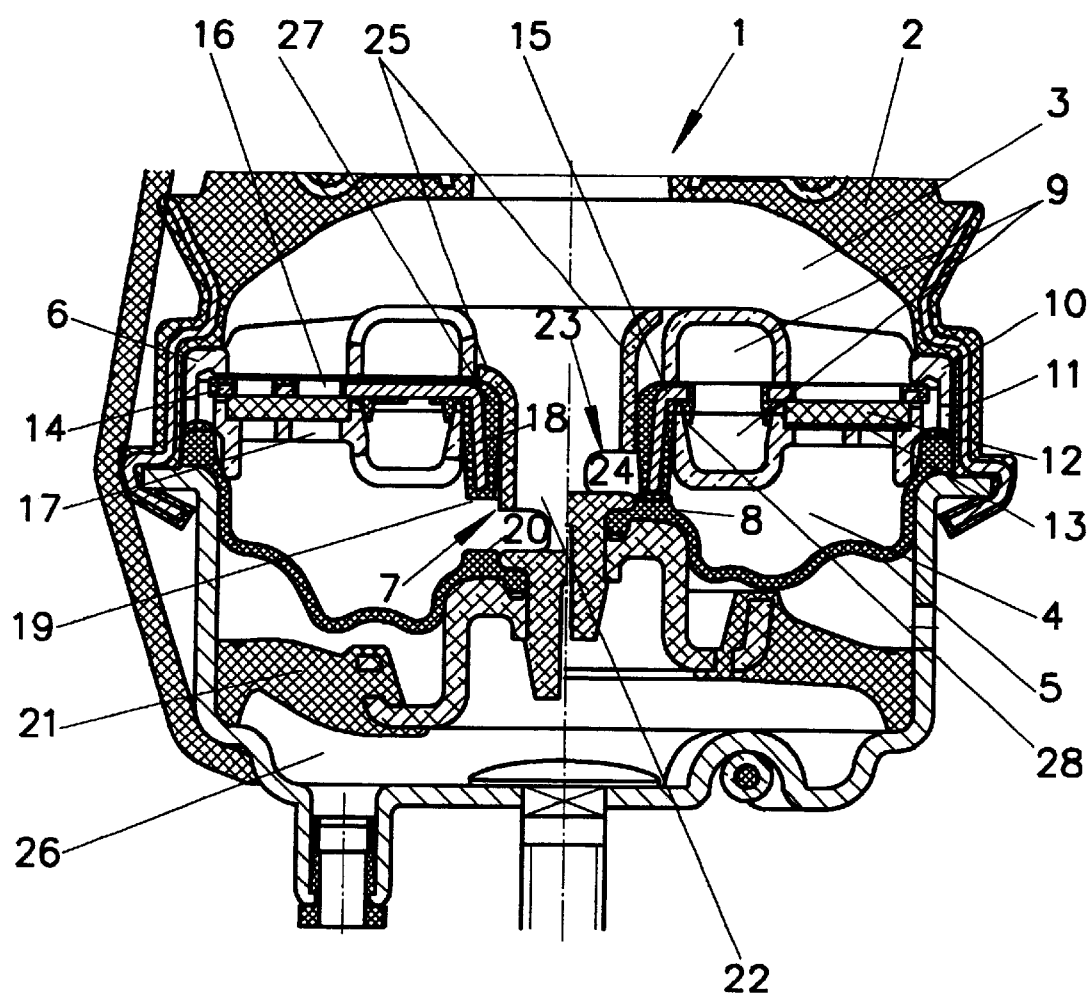
FIG. 1 shows a longitudinal cross-section of a bearing construtcted across the principles of the invention, and FIG. 2 schematically shows one variant of the actuator catch.

FIG. 1 shows the longitudinal cross-section of a dual-mode twin-chamber thrust bearing 1 having hydraulic damping. The right half illustrates the actuator in a closed position; the left half illustrates the actuator in an open position. The upper, purely mechanical part of bearing 1 has been omitted, since it is of the customary design. A journal bearing for connection to a corresponding engine part is located on an elastic body 2. The elastic body 2 and the journal bearing form the upper boundary of a working chamber 3, which is filled with a hydraulic fluid. The working chamber 3 hydraulically communicates with an equalizing chamber 4. The outer wall of the equalizing chamber 4 is formed by roller bellows 5. The chambers 3 and 4 are separated by a partition 6. The partition 6 has a passageway 7 in the center of the partition. The passageway 7 can be closed by an actuator 8.

A damping channel 9 is also located in the partition 6. The damping channel permanently connects the working chamber 3 and the equalizing chamber 4. The partition 6 is formed of a top part 10 and a corresponding bottom part 11, which are connected at their outer edges. The damping channel 9 is integrated in the partition 6, i.e., in the top part 10 or the bottom part 11.

An annular groove 13 in the bottom part 11 of the partition 6 forms a recess for accommodating a membrane 12. There are a series of holes 17 in the partition parts 10, 11 above and below the membrane 12. The holes are covered by the membrane 12.

There is a gap 14 between the top part 10 and the bottom part 11 of the partition 6. An axially movable pressure disk 15 is inserted into the gap 14. The pressure disk 15 covers the membrane 12 and is also used to delimit the damping channel 9. The pressure disk 15 is provided with holes 16, which are flush with the partition holes 17. In the center of these holes, the pressure disk 15 is provided with a hub-like connecting piece 18. The connecting piece protrudes into the passageway 7. A free edge 19 of the connecting piece is directed toward the equalization chamber 4. The free edge 19 forms a stop surface for sealing the passageway 7. A mating surface 20 of the seal is formed by a bead on the roller bellows 5. The middle part of the roller bellows 5 is pressed into the closing position via a spring element 21, as shown on the right side of the figure. The pressure disk 15 is lifted and rests on the top part 10 of the partition 6. The membrane 12 is released and is therefore movable in the axial direction within the groove 13. In this position of the actuator 8, the vibrations are damped by the damping channel 9 and the membrane 12 in conjunction with the holes 16, 17.

A catch 22 is arranged in the middle of the actuator 8, i.e., roller bellows 5. The catch 22 protrudes into the connecting piece 18. The catch 22 has a tulip shape and its bottom area 23 is provided with a lateral passageway 24. The top edge 25 of the catch is crimped outward. When the actuator 8 is opened, i.e., moved downward, the top edge 25 comes to rest on the pressure disk 15, as shown in the left portion of the figure. Thus, the catch presses the pressure disk 15 downward and secures the membrane 12. The actuator 8 is displaced by applying vacuum to a space 26 below a switching spring 21, so that the middle of the roller bellows 5 is pulled downward. When the passageway 7 is opened, the liquid flows from the work chamber 3 into the equalizing chamber 4. The liquid column present in the passageway 7 damps low-frequency vibrations.

The freely movable pressure disk 15 is provided with a coating 27 made of a polymer substance. The pressure disk has sealing lips 28 on its bottom. The sealing lips engage the damping channel 9 to provide a seal.

Figure 2:
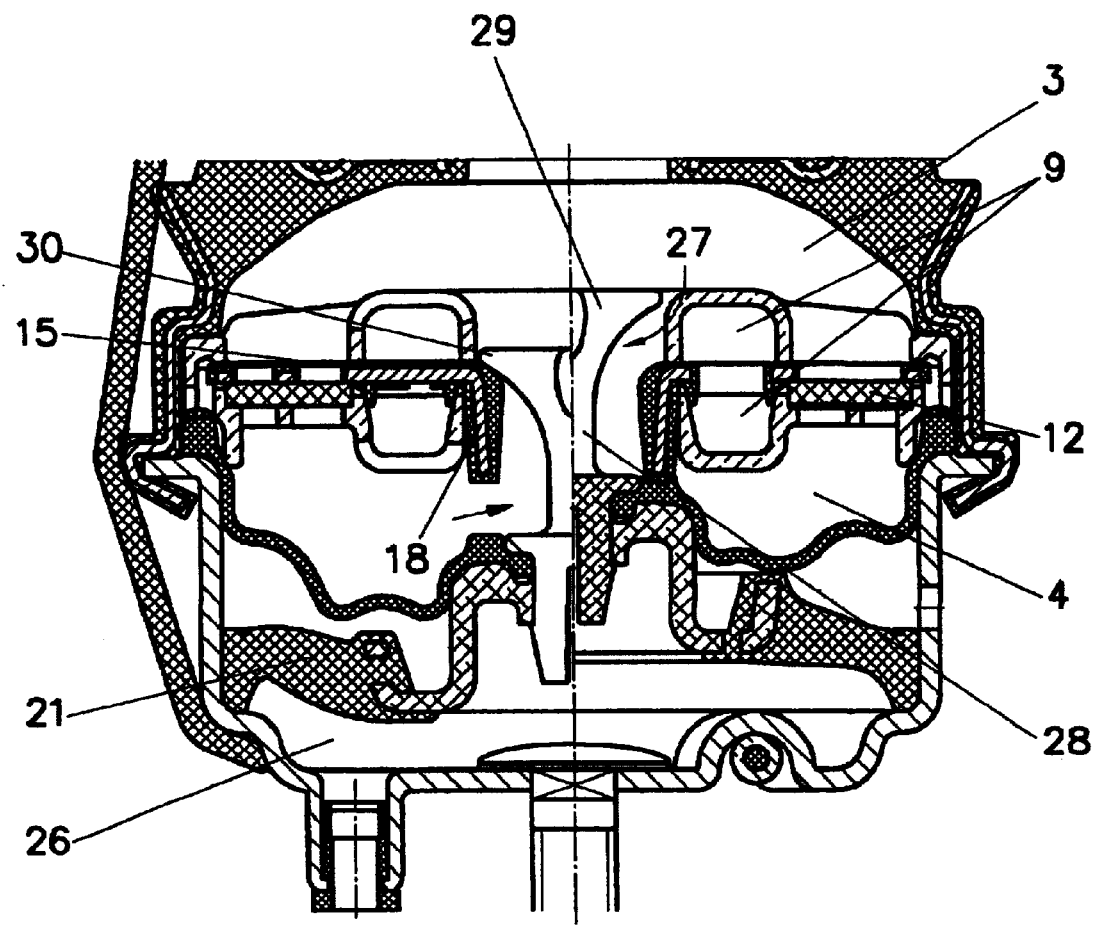

FIG. 2 shows an alternative embodiment of the catch 22. In this embodiment, the catch 22 has a mushroom shape with a star-shaped cap. The star-shaped cap 29 is mounted on a stud 28. The point 30 of the star-shaped cap press the pressure disk 15 axially downward to secure it. In a preferred embodiment, the star-shaped cap has at least three star points 30. All the other parts of the thrust bearing are identical to the parts of FIG. 1.

What is claimed is:

1. A dual-mode twin-chamber thrust bearing having hydraulic damping, comprising:
    a work chamber;
    an equalizing chamber;
    a partition that separates the work chamber from the equalizing chamber, the partition having a passageway formed in the center, the passageway being closable by an actuator, the partition having a recess, the partition having partition holes;
    a damping channel that hydraulically connects the work chamber and the equalizing chamber;
    a membrane located in the recess in the partition, the membrane sized so that it covers the holes in the partition and located so that it can be sealingly positioned; and
    a pressure disk which has pressure disk holes, the pressure disk holes being located in the area of the partition holes, the pressure disk being movable from an open position to a closed position,
    wherein in the closed position, the pressure disk releases the membrane so that the membrane may move, and in the open position, the pressure disk secures the membrane so that the membrane may not move.

2. The thrust bearing according to claim 1, wherein the partition has a top part and a corresponding bottom part, the parts being connected at their outer edges so that they form a gap between the top part and the bottom part, and further wherein the pressure disk is arranged in the gap.

3. The thrust bearing according to claim 1, wherein pressure disk has a hub-like connecting piece formed in the middle, the hub-like connecting piece being arranged in the passageway, the hub-like connecting piece having a free edge directed toward the equalizing chamber.

4. The thrust bearing according to claim 3, wherein the free edge forms a stop surface for sealing the passageway.

5. The thrust bearing according to claim 4, wherein a mating surface of the seal is formed by an annular surface of the movable outer wall of the equalizing chamber.

6. The thrust bearing according to claim 3, wherein the actuator is provided with a catch which protrudes into the connecting piece of the pressure disk, and further wherein when the passageway has been opened by the actuator, the catch rests on the pressure disk to secure the membrane.

7. The thrust bearing according to claim 6 wherein the catch has a tulip shape with lateral passageways in the bottom area, and wherein when the passageway has been opened by the actuator, the top edge rests on the pressure disk.

8. The thrust bearing according to claim 6, wherein the catch has a mushroom shape with a star-shaped cap, the star-shaped cap forming star points which rest on the pressure disk to secure the membrane in the closed position.

9. The thrust bearing according to claim 2 wherein the bottom part of the partition has an annular groove, the membrane being arranged in the annular groove.

10. The thrust bearing according to claim 1 wherein the pressure disk is formed from sheet metal and has a coating made of a polymeric material.

11. The thrust bearing according to claim 1 wherein the pressure disk is provided with seal lips for sealing the damping channel.

12. The thrust bearing according to claim 2 wherein the holes in the pressure disk and the holes in the top and bottom parts of the partition are aligned.

* * * * *

(12) EX PARTE REEXAMINATION CERTIFICATE (5483rd)
United States Patent
Rudolf et al.

(10) Number: US 6,276,672 C1
(45) Certificate Issued: Aug. 29, 2006

(54) DUAL-MODE TWIN-CHAMBER THRUST BEARING HAVING HYDRAULIC DAMPING

(75) Inventors: Hans-Joachim Rudolf, Stadland (DE); Heinz Weber, Hemsbach (DE)

(73) Assignee: Firma Carl Freudenberg, Weinheim (DE)

Reexamination Request:
No. 90/006,660, Jun. 9, 2003

Reexamination Certificate for:
Patent No.: 6,276,672
Issued: Aug. 21, 2001
Appl. No.: 09/488,754
Filed: Jan. 21, 2000

(30) Foreign Application Priority Data

Jan. 22, 1999 (DE) .......................................... 199 02 493

(51) Int. Cl.
*F16F 13/00* (2006.01)
*F16F 15/00* (2006.01)
*F16F 5/00* (2006.01)
*F16F 9/00* (2006.01)
*F16M 5/00* (2006.01)
*F16M 9/00* (2006.01)
*F16M 11/00* (2006.01)

(52) U.S. Cl. ..................................... 267/140.13; 267/219
(58) Field of Classification Search ....................... None
See application file for complete search history.

(56) References Cited

U.S. PATENT DOCUMENTS 5,911,412 A  6/1999  Durand et al. .......... 267/140.13

*Primary Examiner*—Beverly M. Flanagan

(57) ABSTRACT

A dual-mode twin-chamber thrust bearing has a work chamber and an equalizing chamber. The chambers are separated by a partition. The partition has passageway in the center that is closable via an actuator, and also has a damping channel that hydraulically connects two chambers. The partition also has holes. A membrane is located in a recess in the partition. The partition covers the holes in the partition and can be tightly sealed. An axially movable pressure disk secures or releases the membrane as it is pushed by the actuator. The pressure disk is provided with holes in the area of the partition holes.

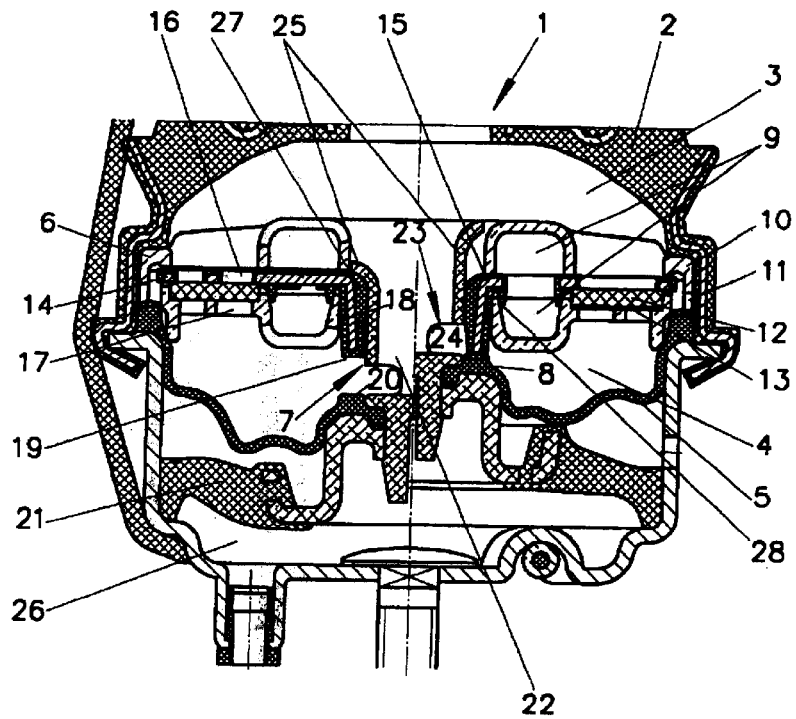

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–5 and 9–12 are cancelled.

Claim 6 is determined to be patentable as amended.

Claims 7 and 8, dependent on an amended claim, are determined to be patentable.

New claims 13–20 are added and determined to be patentable.

6. [The thrust bearing according to claim 3] *A dual-mode twin-chamber thrust bearing having hydraulic damping, comprising:*
  *a work chamber;*
  *an equalizing chamber;*
  *a partition that separates the work chamber from the equalizing chamber, the partition having a passageway formed in the center, the passageway being closable by an actuator, the partition having a recess, the partition having partition holes;*
  *a damping channel that hydraulically connects the work chamber and the equalizing chamber;*
  *a membrane located in the recess in the partition, the membrane sized so that it covers the holes in the partition and located so that it can be sealingly positioned; and*
  *a pressure disk which has pressure disk holes, the pressure disk holes being located in the area of the partition holes, the pressure disk being movable from an open position to a closed position, wherein the closed position, the pressure disk releases the membrane so that the membrane may move, and in the open position, the pressure disk secures the membrane so that the membrane may not move,*
  *wherein the pressure disk has a hub-like connecting piece formed in the middle, the hub-like connecting piece being arranged in the passageway,*
  wherein the actuator is provided with a catch which protrudes into the connecting piece of the pressure disk, and [further] wherein when the passageway has been opened by the actuator, the catch rests on the pressure disk to secure the membrane.

*13. The thrust bearing according to claim 6, wherein the partition has a top part and a corresponding bottom part, the parts being connected at their outer edges so that they form a gap between the top part and the bottom part, and further wherein the pressure disk is arranged in the gap.*

*14. The thrust bearing according to claim 6, wherein the hub-like connecting piece has a free edge directed toward the equalizing chamber.*

*15. The thrust bearing according to claim 14, wherein the free edge forms a stop surface for sealing the passageway.*

*16. The thrust bearing according to claim 15, wherein a mating surface of the seal is formed by an annular surface of the movable outer wall of the equalizing chamber.*

*17. The thrust bearing according to claim 13, wherein the bottom part of the partition has an annular groove, the membrane being arranged in the annular groove.*

*18. The thrust bearing according to claim 6, wherein the pressure disk is formed from sheet metal and has a coating made of a polymeric material.*

*19. The thrust bearing according to claim 6, wherein the pressure disk is provided with seal lips for sealing the damping channel.*

*20. The thrust bearing according to claim 13, wherein the holes in the pressure disk and the holes in the top and bottom parts of the partition are aligned.*

* * * * *